No. 849,213. PATENTED APR. 2, 1907.
P. P. DAUDELIN.
SELF THREADING LOOM SHUTTLE.
APPLICATION FILED MAR. 6, 1905.
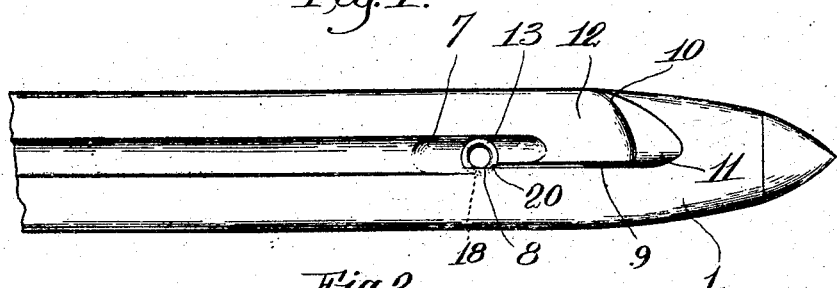
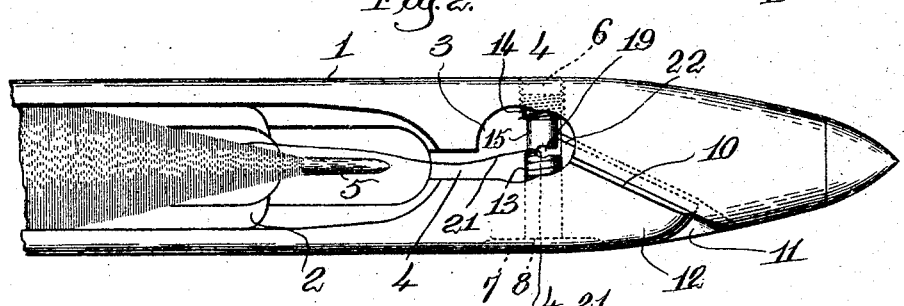
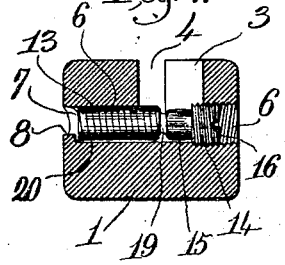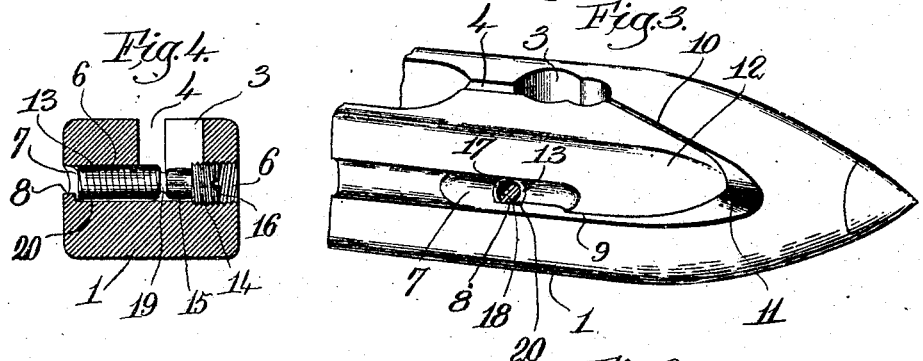
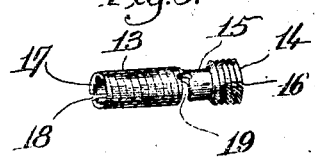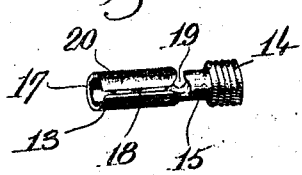
Witnesses.
Thomas Drummond
Samuel W. Sutton
Inventor.
Pierre P. Daudelin,
by Crosby Gregory attys.

UNITED STATES PATENT OFFICE.

PIERRE P. DAUDELIN, OF FALL RIVER, MASSACHUSETTS, ASSIGNOR TO JOHN SHAMBOW, OF WOONSOCKET, RHODE ISLAND.

SELF-THREADING LOOM-SHUTTLE.

No. 849,213.  Specification of Letters Patent.  Patented April 2, 1907.

Application filed March 6, 1905. Serial No. 248,414.

*To all whom it may concern:*

Be it known that I, PIERRE P. DAUDELIN, a citizen of the United States, residing at Fall River, county of Bristol, State of Massachusetts, have invented an Improvement in Self-Threading Loom-Shuttles, of which the following description, in connection with the accompanying drawings, is a specification, like letters on the drawings representing like parts.

This invention relates particularly to what are technically termed "self-threading" shuttles for looms, wherein the thread is led into the delivery-eye by means so arranged as to prevent its subsequent escape therefrom and consequent unthreading of the shuttle.

The objects of my invention are to provide a strong, durable, efficient, and cheap shuttle of the type referred to and which can be easily and quickly threaded, and accordingly I have by a very simple device inserted in the shuttle, coöperating with slots or passages in the latter, effected the desired result, the novel features of my invention being fully described in the subjoined specification and particularly pointed out in the following claims.

Figure 1 is a side elevation of the thread-delivering end of a shuttle embodying my invention. Fig. 2 is a top or plan view thereof, showing the shuttle threaded. Fig. 3 is a perspective view of the part of the shuttle shown in Figs. 1 and 2. Fig. 4 is a transverse section taken on the line 4 4, Fig. 2, looking toward the left, the thread-conductor being shown in elevation; and Figs. 5 and 6 are two perspective views, detached, of the thread-conductor, to be described.

The shuttle-body 1, of usual construction, has a bobbin-recess 2 and a threading-recess 3 at the front end thereof and communicating therewith by a wide cut or channel 4 in alinement with the tip of the bobbin 5, Fig. 2. A hole 6 is bored through the shuttle-body transversely and partly intersecting the recess 3; one end of the hole constituting the side delivery-eye of the shuttle, the side wall of the shuttle being longitudinally recessed or scooped out at 7 (best shown in Figs. 1 and 3 and in dotted lines Fig. 2) adjacent the eye to leave a thread-support or shoulder 8 partially crossing the delivery-eye. The shuttle-body forward of the hole 6 is slitted longitudinally from its side inward to form a thread-passage 9, intersecting the hole 6 from the delivery-eye inward to the farther wall of the recess 2, and a diagonal slit 10 extends from said recess forward to the side of the shuttle and intersecting the slit 9. The shuttle-body is cut away at the forward portion of the intersecting passages 9 and 10, as at 11, to leave a horn 12, under which the thread passes when the shuttle is threaded, as will be described.

Into the hole 6 I insert a tubular metallic conductor (shown separately in Figs. 5 and 6 at 13) having at one end an externally-screw-threaded and enlarged head 14, joined to the body 13 by a reduced neck 15, the head having a nick 16, by which the conductor can be screwed into the hole 6 by means of a screw-driver. When in operative position, the conductor is located as clearly shown in Fig. 4, the end of its body fitting closely the delivery-eye, which latter is practically the adjacent end of the hole 6, the edge of the conductor being rounded off, as at 17, to avoid cutting the thread, Figs. 5 and 6. A longitudinal slot 18 extends the length of the body 13 and is enlarged at its inner end by cross-cutting the neck 15 at 19 and enlarging the upper and lower portions of the cross-cut, as shown. The body is externally cut away or recessed adjacent the slot 18 at 20, so that when the conductor is in position a clearance-space is left between it and the wood of the shuttle-body just above and extending the length of the slot. When the conductor is so positioned, the slot is at the bottom, its outer end terminating behind and below the thread-support or shoulder 8, and the thread-passage 9 opens into the clearance 20 the length of the slot, while the cross-cut 19 stands upright and open toward the point of the shuttle, as shown in Fig. 2.

In threading the shuttle the thread 21 is first drawn forward into the channel 4 and recess 3 and thence into the slit or passage 10 (the walls of which are inclined longitudinally and also with relation to the plane of the passage 9) and then under the horn 12 into the passage 9 beneath the horn. By a rearward pull the thread is then drawn along the passage 9 into the clearance 20 and thence passes into the conductor and the delivery-eye through the slot 18, and when passing through the outer end thereof the thread is bent to pass over the shoulder or support 8. At the same time the bight of the thread draws over the point 22, Fig. 2, in the shuttle-body and slides through the cross-cut 19 completely into the slot 18 and within the body 13 of the conductor. The shuttle is now completely threaded, the thread drawing through channel 4 and recess 3 over the neck 15 into the enlarged portion of the cross-cut, as shown in Fig. 2, turning then at an angle and traversing the body 13 of the conductor, passing out of its end through the delivery-eye over the shoulder 8. As the top of the latter is above the outer end of the slot 18, which latter serves as an inlet to the delivery-eye, it will be manifest that the thread cannot be drawn out through the slot to unthread the shuttle. The passages 9 and 10 and the nose 12, with the point 22, direct or guide the thread from the recess 3 into the inlet and thence to the delivery-eye and the conductor, which latter is coaxial with the eye, the rounded end 17 of the conductor preventing any abrasion or cutting of the thread as it is delivered.

The formation of the threading-passages, the recess 3, and hole 6 in the shuttle-body is effected readily and cheaply, and the conductor is also easily and cheaply made and inserted in position.

Changes or modifications may be made in the construction and arrangement herein shown and described without departing from the spirit and scope of my invention.

Having fully described my invention, what I claim as new, and desire to secure by Letters Patent, is—

1. The combination, in a shuttle having a delivery-eye in its side, and a portion of the shuttle-body crossing the lower portion of the eye, to form a thread-support, of a tubular, externally-threaded conductor screwed into the shuttle-body coaxially with the eye and having a longitudinal slot terminating at its outer end below the thread-support, to constitute an inlet for the delivery-eye, said conductor being cut away transversely at the inner end of the slot to permit the thread to be drawn thereinto, and means on the shuttle-body to guide the thread to the cut-away portion of the conductor.

2. The combination in a shuttle having a delivery-eye, of a tubular, externally-threaded conductor screwed into the shuttle coaxially with the eye and having a longitudinal slot communicating at its outer end with the eye, to form a thread-inlet therefor, the inner end of the inlet being enlarged to receive the thread, means to guide the thread to such enlarged portion of the inlet, and a thread-support on the shuttle-body above and crossing the outer end of the inlet.

3. The combination, in a shuttle having a delivery-eye, of a tubular, externally-threaded conductor screwed into the shuttle coaxially with the eye and having a longitudinal slot enlarged at its inner end and at its outer end communicating with and forming a thread-inlet for the delivery-eye, a thread-support on the shuttle-body above and crossing the outer end of the inlet, and intersecting passages in the shuttle-body to direct the thread down to and into the conductor and delivery-eye through the longitudinal slot.

4. The combination in a shuttle having a side delivery-eye and a passage intersecting it, of a tubular conductor inserted in the shuttle coaxially with the eye and having in its bottom a longitudinal slot enlarged at its inner end and at its outer end communicating with the eye, to form a thread-inlet therefor, the conductor being externally recessed above the slot to register with the passage in the shuttle and permit the thread to enter the slot, an intersecting passage in the shuttle to direct the thread to the slot, and a shoulder on the shuttle above and crossing the outer end of the slot, to prevent escape of the thread from the delivery-eye and the conductor.

In testimony whereof I have signed my name to this specification in the presence of two subscribing witnesses.

PIERRE P. DAUDELIN.

Witnesses:
FRANK MULVENY,
MILTON DRUCE.